(57.) 3 Sheets--Sheet 3.

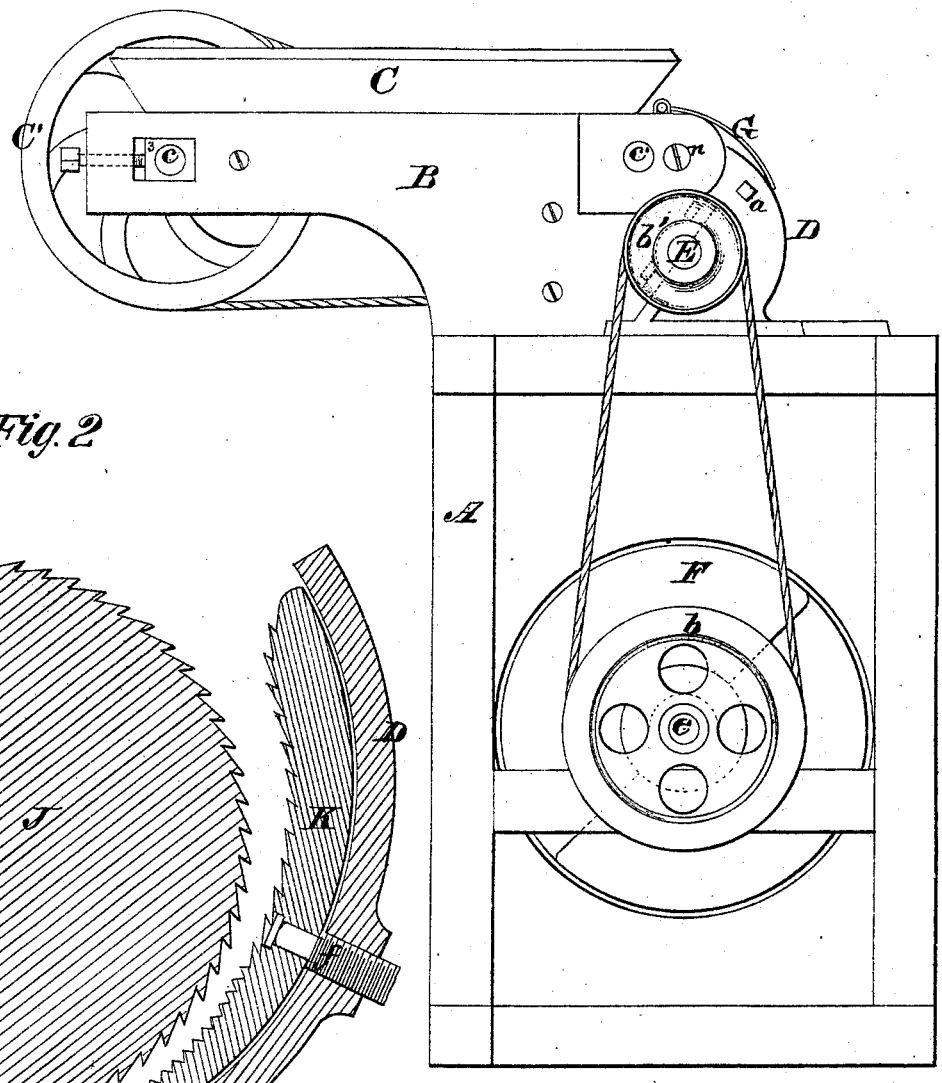

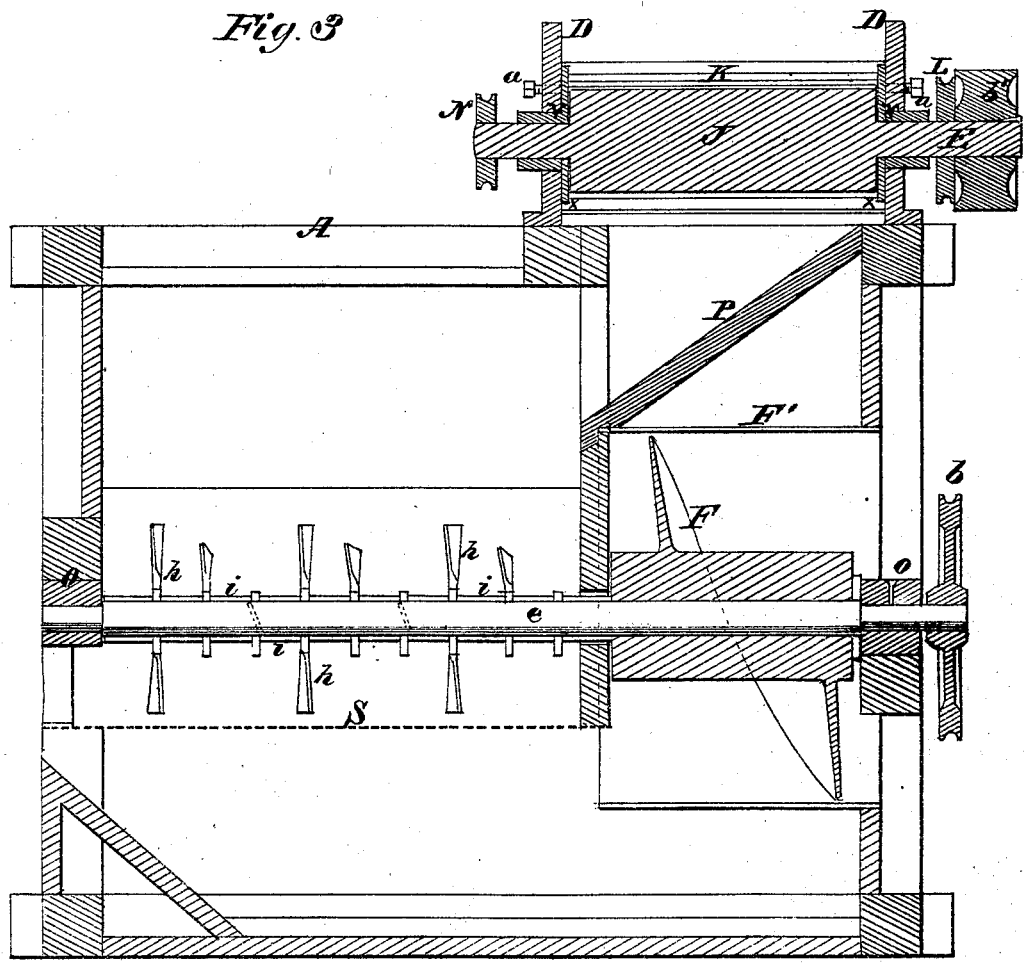

W. H. TROTT, D. R. TORBETT, & F. A. POMEROY.

Improvement in Cotton Seed Huller.

No. 122,341. Patented Jan. 2, 1872.

Witnesses.
R. T. Campbell,
J. N. Campbell.

Inventors.
Wm. H. Trott
David R. Torbett
F. A. Pomeroy
by their Attys
Mason Fenwick & Lawrence

UNITED STATES PATENT OFFICE.

WILLIAM H. TROTT, DAVID R. TORBETT, AND FREDERICK A. POMEROY, OF COLUMBUS, GEORGIA.

IMPROVEMENT IN COTTON-SEED HULLERS.

Specification forming part of Letters Patent No. 122,341, dated January 2, 1872.

*To all whom it may concern:*

Be it known that we, WILLIAM H. TROTT, DAVID R. TORBETT, and FREDERICK A. POMEROY, of Columbus, in the county of Muscogee and State of Georgia, have invented certain new and useful Improvements in Cotton-Seed Hullers; and we do hereby declare that the following is a full, clear, and exact description thereof, reference being had to the accompanying drawing making part of this specification, in which—

Figure 4:
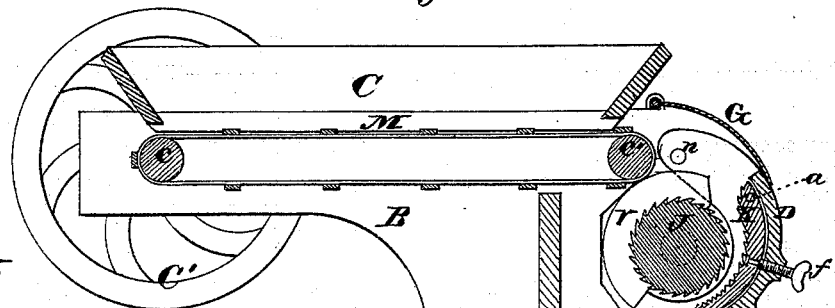
Figure 5:
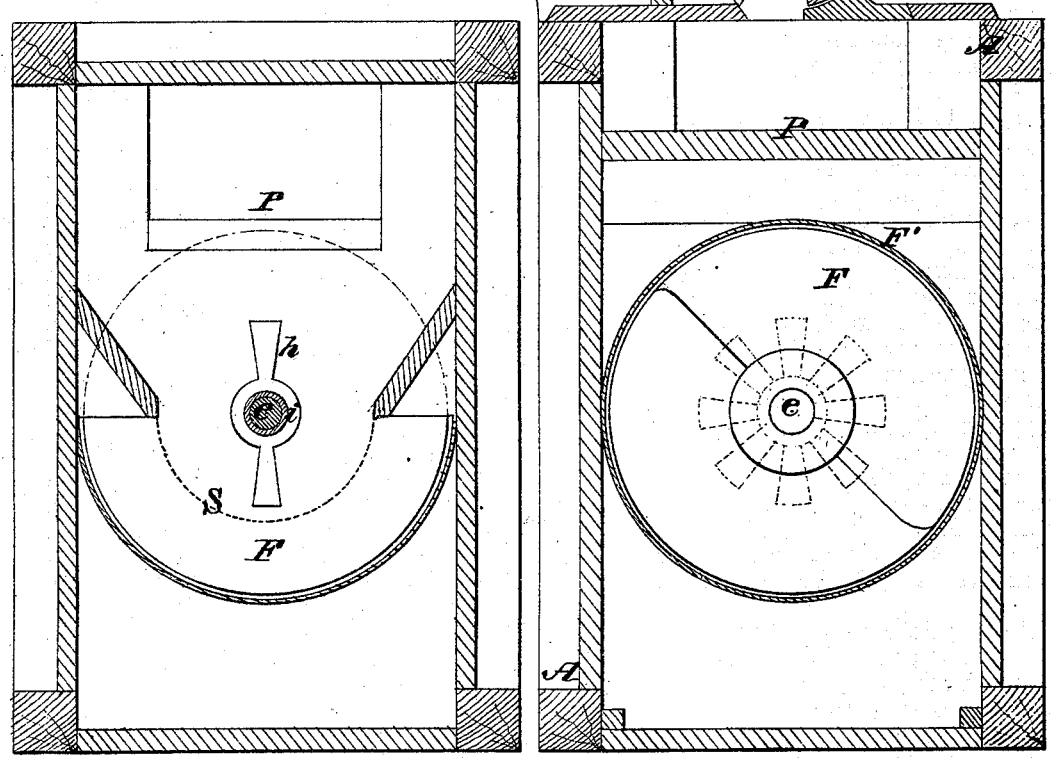

Figure 1, Plate 1, is an elevation of the receiving end of the machine. Fig. 2 is a cross-section, in detail, of the hulling-drum, the adjustable concave, and shell. Fig. 3, Plate 2, is a section taken centrally, longitudinally, and vertically through the machine. Fig. 4, Plate 3, is a section taken vertically and transversely through the feeding, hulling, and blasting apparatus. Fig. 5, Plate 3, is a section taken vertically and transversely through the machine, showing the screen and rotary beaters.

Similar letters of reference indicate corresponding parts in the several figures.

This invention relates to certain improvements on machinery for removing the fibrous hulls from cotton-seed, wherein we employ a feed-apron, a hulling-drum and concave, a blast-fan, a series of beaters, and a screen, arranged and constructed as will be hereinafter explained.

The following description of our invention will enable others skilled in the art to understand its construction and operation.

In the accompanying drawing, A represents the frame-work of the machine, which is properly housed in, except at certain points where the seeds enter, where the air is admitted to the blast-fan F, and where the hulls and trash are discharged. On top of the frame A, and at one end thereof, is the feed-box B, which is secured to the shell D of a concave, K, by means of screws $n$ passed through ears formed on B. This box B has applied to it a hopper, C, and two rollers, $c$ $c'$, the former one of which, with adjustable bearings 3, carries on the end of one of its journals a belt that is passed around a wheel, N, on the journal of the hulling-drum J. Around the rollers $c$ $c'$ is passed an endless apron, M, which is slatted, and which is arranged horizontally so as to convey the seeds in the hull from the hopper C and deposit them into a space between the hulling-cylinder J and concave K. The shell D is a cast-metal segment with a foot piece formed on it, by which it is bolted down firmly upon the frame A. This shell D is constructed with open boxes, well babbitted, forming bearings for the journals of a serrated drum, J; also with solid bosses X projecting inward to receive the concave K to keep the latter from being forced in contact with drum J. On one end of journal E is keyed a driving belt-wheel, $b'$, and a pulley, L, from which latter a belt is carried to a pulley, $b$, on a long shaft, $e$. The seeds in the hull are delivered from the apron M into a space between the drum J and concave K, where they are hulled and discharged into a screen, S, over an inclined board or chute, P. The teeth on the drum J extend its whole length, and are beveled so as to present acute cutting-edges. The teeth on the upper part of the concave K correspond in shape to the teeth on the drum J, but are directed upward, as shown in Figs. 2 and 4. The teeth are gradually made finer below the center of the concave, and are V-shaped, the lower ones being directed a little downward. This concave K is hung by means of two pivots, $a$ $a$, applied to its upper corners and tapped through the sides of the shell D. At or near the middle of the concave is a swivel-screw, $f$, which passes through the shell D, and is used for adjusting the lower part of the concave toward or from the drum J. After the seeds leave the drum and are received into the screen S they are operated upon by means of beating-blades $h$, which are applied radially upon the shaft $e$, and properly spaced thereon by means of tubes $i$, as shown in Fig. 3. The beaters are feathered so as to direct the hulls and trash out of the open end of the screen while the hulled seed fall through the screen into a chamber below. During the fall of the seeds from the screen S they are subjected to the action of a strong blast from a screw-fan, F, which is applied on the beater-shaft $e$, as shown in Fig. 3, which blows out of the machine the lint and other foreign substances which pass through the screen, leaving the kernels clean and ready for pressing.

Instead of the horizontal slatted apron M an elevating-apron or cupped conveyer may be employed, which will elevate the seeds from a gin-room and deliver them into the hulling-chamber.

Having described our invention, what we claim as new, and desire to secure by Letters Patent, is—

1. The concave K, hung by pivots near its upper edge, in combination with the swivel-adjusting screw $f$, the shell D, constructed as described, and drum J, substantially as set forth.

2. The relative arrangement of fan F, beaters-arm $h\ h$, screen S, and hulling devices, substantially as described.

WILLIAM H. TROTT.
DAVID R. TORBETT.
FREDERICK A. POMEROY.

Witnesses:
WM. H. BEDELL,
Z. T. KING,
CLIFF B. GRIMES,
  Notary Public and Ex-Off. J. P. (57)